United States Patent
Fujita et al.

(10) Patent No.: US 7,226,981 B2
(45) Date of Patent: Jun. 5, 2007

(54) CURING AGENT COMPOSITION FOR EPOXY RESIN

(75) Inventors: Naohiro Fujita, Saitama (JP); Ryo Ogawa, Saitama (JP); Shoji Kusano, Saitama (JP)

(73) Assignee: Asahi Denka Co., Ltd., Tokyo (JP)

( * ) Notice: Subject to any disclaimer, the term of this patent is extended or adjusted under 35 U.S.C. 154(b) by 417 days.

(21) Appl. No.: 10/846,599

(22) Filed: May 17, 2004

(65) Prior Publication Data

US 2004/0236061 A1 Nov. 25, 2004

(30) Foreign Application Priority Data

May 20, 2003 (JP) .............................. 2003-142009

(51) Int. Cl.
*C08L 63/00* (2006.01)
*C08L 61/20* (2006.01)
*C08G 12/00* (2006.01)

(52) U.S. Cl. ...................... 525/523; 525/471; 528/106; 528/119; 528/220; 528/228; 528/229

(58) Field of Classification Search ..................... None
See application file for complete search history.

(56) References Cited

FOREIGN PATENT DOCUMENTS

| JP | 05-132541 | | 5/1993 |
|---|---|---|---|
| JP | 05-271389 | * | 10/1993 |
| JP | 63-273629 | | 11/1998 |
| JP | 63-273630 | | 11/1998 |

OTHER PUBLICATIONS

Machine translation of JP 05-271389, provided by the JPO website.*
Machine translation of JP 05-132541, provided by the JPO website.*

* cited by examiner

*Primary Examiner*—Michael J. Feely
(74) *Attorney, Agent, or Firm*—Young & Thompson

(57) ABSTRACT

An epoxy resin curing agent composition containing a ketimine compound prepared by the reaction between a polyoxypropylenediamine component and a ketone compound, wherein (1) the polyoxypropylenediamine component is a 9/1 to 6/4 (by weight) mixture of polyoxypropylenediamine having a molecular weight of 200 and 500 and polyoxypropylenediamine having a molecular weight of 1000 to 3000, (2) the ketimine compound has a degree of ketimination of 90% or higher, or (3) the reaction is carried out in the presence of a catalyst selected from (i) a combination of a tertiary amine and a sulfonic acid and (ii) a salt between a tertiary amine and a sulfonic acid.

7 Claims, No Drawings

CURING AGENT COMPOSITION FOR EPOXY RESIN

FIELD OF THE INVENTION

This invention relates to a curing agent composition for epoxy resins and, more particularly, to an epoxy resin curing agent composition used in combination with a polyepoxy compound to provide a one-component curable epoxy resin composition that is moisture curable at room temperature and excellent in storage stability, curability, and adhesion to a substrate.

BACKGROUND OF THE INVENTION

With their excellent characteristics taken advantage of, epoxy resins have been widely used in various applications including coatings, adhesives, civil engineering, and construction. However, most of them are of two-pack type and provide poor workability on use. One-pack systems can be obtained by using a latent curing agent such as dicyandiamide, a catalyst capable of generating radicals on UV irradiation whereby to cure an epoxy resin, an acid anhydride curing agent, and the like. Nevertheless such techniques involve heating for cure or require equipment for UV irradiation. Moreover, cured products obtained from these one-pack systems are generally poor in flexibility.

A curable epoxy resin composition containing a ketimine as a curing agent is known as a one-component, room-temperature curing system free from the above disadvantages. A ketimine reacts with moisture supplied from the outside to produce an amine by which to cure an epoxy resin. Epoxy resin compositions making use of this system are disclosed in JP-A-63-273629 and JP-A-63-273630. However, the proposed epoxy resin compositions have poor storage stability, or need a modified silicone resin for obtaining a flexible cured product, or, when applied to a general-purpose epoxy resin, provides a hard cured product unless the formulation is narrowly limited.

JP-A-5-132541 proposes a polyoxyalkylenediamine-based ketimine compound. When a low molecular weight polyoxyalkylenediamine-based ketimine compound specifically disclosed in the publication is used alone, the resulting epoxy resin composition has insufficient adhesion to a substrate. When, on the other hand, in using a high molecular weight polyoxyalkylenediamine-based ketimine compound alone, the resulting epoxy resin composition has insufficient curability. In addition, the process of preparing the ketimine compound according to JP-A-5-132541 has difficulty in obtaining a desired ketimine compound at a high degree of ketimination, only to provide an epoxy resin composition having poor storage stability.

SUMMARY OF THE INVENTION

An object of the present invention is to provide an epoxy resin curing agent composition used in combination with a polyepoxy compound to provide a one-component curable epoxy resin composition excellent in storage stability, curability, and adhesion to a substrate.

As a result of extensive investigations, the present inventors have found that a specific ketimine compound obtained from a ketone compound and a mixture of two polyoxypropylenediamine species having different molecular weights, when combined with a polyepoxy compound, provides a one-component curable epoxy resin composition excellent in storage stability, curability, and adhesion to a substrate.

Based on the above finding, the present invention provides, in its first aspect, an epoxy resin curing agent composition containing a ketimine compound prepared by the reaction between a polyoxypropylenediamine component and a ketone compound, wherein the polyoxypropylenediamine component is a mixture comprising polyoxypropylenediamine having a molecular weight of 200 to 500 and polyoxypropylenediamine having a molecular weight of 1000 to 3000 in a weight ratio of 9/1 to 6/4.

The present invention also provides, in its second aspect, an epoxy resin curing agent composition containing a ketimine compound prepared by the reaction between polyoxypropylenediamine and a ketone compound, wherein the ketimine compound has a degree of ketimination of 90% or higher.

The present invention also provides, in its third aspect, an epoxy resin curing agent composition containing a ketimine compound prepared by the reaction between polyoxypropylenediamine and a ketone compound, wherein the reaction is carried out in the presence of a catalyst selected from the group consisting of a combination of a tertiary amine and a sulfonic acid and a salt between a tertiary amine and a sulfonic acid.

The present invention additionally provides a one-component curable epoxy resin composition comprising a polyepoxy compound and the epoxy resin curing agent composition according to the first, second or third aspect of the invention.

DETAILED DESCRIPTION OF THE INVENTION

The epoxy resin curing agent composition according to the first aspect of the invention will be described.

The epoxy resin curing agent composition according to the present invention is characterized by containing a ketimine compound obtained from a polyoxypropylenediamine component and a ketone compound. A ketimine compound is usually obtained by condensation reaction between a compound having a primary amino group in the molecule and a compound having a ketone group in the molecule. When provided with moisture, a ketimine compound readily produces a primary amine to function as a curing agent in an epoxy resin composition. The ketimine compound is stable even in a system containing a polyepoxy compound unless it is brought into contact with moisture supplied from the outside of the system and therefore very useful as a curing agent of a one-component type epoxy resin composition.

The polyoxypropylenediamine species which can be used as a polyoxypropylenediamine component are represented by formula:

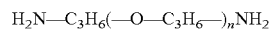

$$H_2N-C_3H_6(-O-C_3H_6-)_nNH_2$$

wherein n represents a positive number.

The polyoxypropylenediamine component used in the first aspect of the invention is a mixture of polyoxypropylenediamine having a molecular weight of 200 to 500 (n≈2 to 8), preferably 200 to 400 (n≈2 to 6), and polyoxypropylenediamine having a molecular weight of 1000 to 3000 (n≈15 to 50), preferably 1200 to 2500 (n≈20 to 40). The weight ratio of the former to the latter is 9/1 to 6/4, preferably 8.5/1.5 to 5.5/4.5. If the weight ratio is greater than 9/1, the resulting epoxy resin composition tends to have reduced adhesion to a substrate. If the ratio is smaller than 6/4, the resulting epoxy resin composition tends to have reduced curability.

The ketone compound includes acetone, methyl ethyl ketone, diethyl ketone, methyl propyl ketone, methyl isopropyl ketone, methyl isobutyl ketone, diisopropyl ketone, phenyl methyl ketone, methylhexanone, methylcyclohexanone, cyclopentanone, cycloheptanone, acetophenone, and a ketone resin. Preferred of them are dialkyl ketones, particularly methyl isobutyl ketone.

The ketimine compound for use in the epoxy resin curing composition of the present invention, which is obtained by the reaction between the polyoxypropylenediamine component and the ketone compound, preferably has a degree of ketimination of 90% or higher, still preferably 95% or higher. When the degree of ketimination is lower than 90%, an epoxy resin composition containing such a ketimine compound as a curing agent tends to have reduced storage stability.

The process for preparing the ketimine compound from the polyoxypropylenediamine component and the ketone compound is not particularly restricted. For example, the ketimine compound can easily be obtained by allowing the polyoxypropylenediamine component and the ketone compound to react in the presence of a catalyst with or without a solvent.

The amount of the ketone compound to be used in the reaction is usually 2 moles or more per mole of the polyoxypropylenediamine component.

The catalyst which can be used in the reaction includes tertiary amines, such as trimethylamine, ethyldimethylamine, triethylamine, propyldimethylamine, tributylamine, triethylenediamine, N,N'-dimethylpiperazine, pyridine, picoline, 1,8-diazabicyclo(5.4.0)undecene-7, benzyldimethylamine, 2-(dimethylaminomethyl)phenol, and 2,4,6-tris(dimethylaminomethyl)phenol; and sulfonic acids, such as methanesulfonic acid, benzenesulfonic acid, m-xylenesulfonic acid, p-toluenesulfonic acid, hydroxymethylsulfonic acid, 2-hydroxyethylsulfonic acid, hydroxypropylsulfonic acid, trifluoromethanesulfonic acid, sulfosalicylic acid, and sulfophthalic acid. To achieve a high degree of ketimination, it is preferred to use a combination of the tertiary amine and the sulfonic acid or a salt formed of the tertiary amine and the sulfonic acid, especially a triethylamine salt of p-toluenesulfonic acid.

The catalyst is preferably used in an amount of 0.001 to 5% by weight, still preferably 0.01 to 1% by weight, based on the polyoxypropylenediamine component. Less than 0.001 wt % catalyst is little effective for reaction promotion. Use of more than 5 wt % catalyst not only results in waste but tends to impair storage stability of the resulting one-component curable epoxy resin composition.

When the reaction is conducted in a solvent, the ketone compound as a reactant, such as acetone or methyl ethyl ketone, can be used in excess to serve as a solvent. Other solvents that can be used for the reaction include aromatic hydrocarbons, such as benzene, toluene, and xylene, dioxane, tetrahydrofuran, and N-methyl-2-pyrrolidone. The amount of the solvent, while arbitrary, usually ranges from 10 to 100% by weight based on the total amount of the polyoxypropylenediamine component and the ketone compound.

The epoxy resin curing agent composition of the present invention may contain a ketimine compound other than the above-described ketimine compound obtained from the polyoxypropylenediamine component and the ketone compound. Examples of other ketimine compounds are those obtained from the above-recited ketone compounds and polyalkylpolyamines, such as diethylenetriamine, triethylenetriamine, and tetraethylenepentamine; alicyclic polyamines, such as 1,2-diaminocyclohexane, 1,4-diamino-3,6-diethylcyclohexane, and isophoronediamine; aromatic polyamines, such as m-xylylenediamine, diaminodiphenylmethane, and diaminodiphenylsulfone; or polyoxyalkylenepolyamines, such as polyoxyethylene-polyamine, polyoxytetramethylene-polyamine, polyoxyethylene-polyoxypropylene-polyamine. To assure the effects of the present invention, the amount of the other ketimine compounds to be used is preferably, while arbitrary, not more than 50% by weight based on the total amount of the ketimine compounds.

The epoxy resin curing agent composition according to the second aspect of the invention contains a ketimine compound obtained by the reaction between polyoxypropylenediamine and a ketone compound, the ketimine compound having a degree of ketimination of 90% or higher.

The polyoxypropylenediamine includes, but is not limited to, those recited above with respect to the first aspect of the invention. All the other particulars of the first aspect of the invention apply to the second aspect of the invention.

The epoxy resin curing agent composition according to the third aspect of the invention contains a ketimine compound prepared by the reaction between polyoxypropylenediamine and a ketone compound, the reaction being carried out in the presence of a catalyst selected from the group consisting of a combination of a tertiary amine and a sulfonic acid and a salt between a tertiary amine and a sulfonic acid.

The polyoxypropylenediamine includes, but is not limited to, those recited above with respect to the first aspect of the invention. All the other particulars of the first aspect of the invention apply to the third aspect of the invention.

The epoxy resin curing agent compositions according to the first to third aspects of the invention are combined with a polyepoxy compound to provide one-component curable epoxy resin compositions excellent in storage stability, curability, and adhesion to a substrate.

The polyepoxy compound includes polyglycidyl ethers of mononuclear polyhydric phenol compounds, such as hydroquinone, resorcin, pyrocatechol, and phloroglucinol; polyglycidyl ethers of polynuclear polyhydric phenol compounds, such as dihydroxynaphthalene, biphenol, methylenebisphenol (i.e., bisphenol F), methylenebis(ortho-cresol), ethylidenebisphenol, isopropylidenebisphenol (i.e., bisphenol A), isopropylidenebis(ortho-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolak, ortho-cresol novolak, ethylphenol novolak, butylphenol novolak, octylphenol novolak, resorcin novolak, and terpenediphenol; polyglycidyl ethers of ethylene oxide and/or propylene oxide adducts of the above-recited mono- or polynuclear polyhydric phenol compounds; polyglycidyl ethers of hydrogenation products of the above-recited mononuclear polyhydric phenol compounds; polyglycidyl ethers of polyhydric alcohols, such as ethylene glycol, propylene glycol, butylene glycol, hexanediol, polyglycol, thiodiglycol, glycerol, trimethylolpropane, pentaerythritol, sorbitol, and bisphenol A ethylene oxide adducts; homo- or copolymers of glycidyl esters of aliphatic, aromatic or alicyclic polybasic acids, such as maleic acid, fumaric acid, itaconic acid, succinic acid, glutaric acid, suberic acid, adipic acid, azelaic acid, sebacic acid, dimer acid, trimer acid, phthalic is acid, isophthalic acid, terephthalic acid, trimellitic acid, trimesic acid, pyromellitic acid, tetrahydrophthalic acid, hexahydrophthalic acid, and endomethylenetetrahydrophthalic acid, and glycidyl methacrylate; epoxy compounds having a glycidylamino group, such as N,N-diglycidylaniline and bis(4-(N-methyl-N-glycidylamino)phenyl)methane; epoxy compounds of cyclic olefin compounds, such as vinylcyclohexene diepoxide, dicyclopentanediene diepoxide, 3,4-epoxycyclohexylmethyl-3,4-epoxycyclohexanecarboxylate, 3,4-epoxy-6-methylcyclohexylmethyl-6-methylcyclohexanecarboxylate, and bis(3,4-epoxy-6-methylcyclohexylmethyl) adipate; epoxidized conjugated diene polymers, such as epoxidized polybutadiene and epoxidized styrene-butadiene copolymers; and heterocyclic compounds, such as triglycidyl isocyanurate. These polyepoxy compounds may be internally crosslinked by an isocyanate terminated prepolymer. Preferred of the recited polyepoxy compounds are polyglycidyl ethers of polynuclear polyhydric phenol compounds.

The amount of the epoxy resin curing agent composition in the one-component curable epoxy resin composition is selected so that the number of active hydrogen atoms of the primary amine produced by the reaction of the ketimine compound with moisture may be usually 0.6 to 1.4, preferably 0.8 to 1.2, per epoxy group of the polyepoxy compound. Where the active hydrogen to epoxy group ratio is smaller than 0.6 or greater than 1.4, reduction in curability of the epoxy resin composition and reduction in water resistance and mechanical strength of a cured product may result.

If necessary, the one-component curable epoxy resin composition of the present invention is used as dissolved in an organic solvent.

Useful organic solvents include ketones, such as methyl ethyl ketone, methyl amyl ketone, diethyl ketone, acetone, methyl isopropyl ketone, propylene glycol monomethyl ether acetate, and cyclohexanone; ethers, such as tetrahydrofuran, 1,2-dimethoxyethane, and 1,2-diethoxyethane; esters, such as ethyl acetate and n-butyl acetate; alcohols, such as isobutanol, n-butanol, 2-propanol, n-propanol, and amyl alcohol; aromatic hydrocarbons, such as benzene, toluene, and xylene; terpene hydrocarbon oils, such as turpentine oil, D-limonene, and pinene; paraffinic solvents, such as mineral spirit, Swasol #310 (from Cosmo Matsuyama Oil Co., Ltd.), and Solvesso #100 (from Exxon Chemical Company); halogenated aliphatic hydrocarbons, such as carbon tetrachloride, chloroform, trichloroethylene, and methylene chloride; halogenated aromatic hydrocarbons, such as chlorobenzene; aniline, triethylamine, pyridine, dioxane, acetic acid, acetonitrile, and carbon disulfide.

The organic solvent can be used in an amount preferably of up to 200 parts by weight per 100 parts by weight of the total solids content inclusive of the ketimine compound and the polyepoxy compound. If the solvent is used in amounts exceeding 200 parts by weight, the vaporized solvent can cause danger and toxicity.

If desired, the one-component curable epoxy resin composition can contain a reactive or non-reactive diluent. The reactive diluents include monoglycidyl ether compounds, such as monoglycidyl ether of phenol, cresol, ethylphenol, propylphenol, p-tert-butylphenol, p-tert-amylphenol, hexylphenol, octylphenol, nonylphenol, dodecylphenol, octadecylphenol or terpenephenol. Examples of the non-reactive diluents are dioctyl phthalate, dibutyl phthalate, and benzyl alcohol.

The one-component curable epoxy resin composition can contain a cure accelerator. Examples of the cure accelerators include tertiary amines, such as trimethylamine, ethyldimethylamine, propyldimethylamine, N,N'-dimethylpiperazine, pyridine, picoline, 1,8-diazabicyclo(5.4.0)undecene-1 (DBU), benzyldimethylamine, 2-(dimethylaminomethyl)phenol (DMP-10), and 2,4,6-tris(dimethylaminomethyl)phenol (DMP-30); phenols, such as phenol novolak, o-cresol novolak, p-cresol novolak, t-butylphenol novolak, and dicyclopendadiene cresol; p-toluenesulfonic acid, and a 1-aminopyrrolidine salt of thiocyanic acid.

The one-component curable epoxy resin composition can contain commonly employed additives according to necessity. Such additives include fillers and pigments, such as glass fiber, carbon fiber, cellulose, silica sand, cement, kaolin, clay, aluminum hydroxide, bentonite, talc, silica, fine silica powder, titanium dioxide, carbon black, graphite, iron oxide, and bituminous substances; thickeners; thixotropic agents; flame retardants; anti-foaming agents; anti-corrosive agents; colloidal silica, colloidal alumina, and so forth. Tacky resins, such as xylene resins and petroleum resins, are also useful in combination.

The one-component curable epoxy resin composition finds use in a wide variety of applications, such as coatings or adhesives for concrete, cement mortar, metals, leather, glass, rubber, plastics, wood, fabric, and paper; pressure-sensitive adhesives of packing adhesive tapes, self-adhesive labels, labels for frozen foods, removable labels, point-of-sale (POS) labels, self-adhesive wallpapers, and self-adhesive flooring materials; converted papers, such as art paper, lightweight coated paper, cast-coated paper, coated boards, carbonless copy paper, and impregnated paper; fiber treating agents, such as sizing agents, anti-fraying agents, and other processing agents for natural fibers, synthetic fibers, glass fiber, carbon fiber, and metal fibers; and construction materials, such as sealing compounds, cement admixtures, and waterproofing compounds. It is especially useful in coating applications because it provides a coating film excellent in anticorrosion, adhesion, curing properties, and solvent resistance.

The present invention will now be illustrated in greater detail with reference to Examples and Comparative Examples, but it should be understood that the invention is not construed as being limited thereto.

In Examples 1 to 11 and Comparative Example 1, epoxy resin curing agent compositions were prepared. In Examples 12 to 22 and Comparative Example 2 one-component curable epoxy resin compositions were prepared by using the epoxy resin curing agent compositions of Examples 1 to 11 and Comparative Example 1, respectively, and the resulting epoxy resin compositions were evaluated for performance properties.

EXAMPLE 1

In a 1-liter volume, four-necked flask equipped with a reflux tube were charged 230 g (1 mol) of polyoxypropylenediamine (hereinafter abbreviated as PPG diamine) (Mw: 230), 26 g (0.013 mol) of PPG diamine (Mw: 2000), 0.26 g (corresponding to 0.1 wt % of the total PPG diamine content) of p-toluenesulfonic acid (hereinafter abbreviated as PTS) triethylamine salt, 300 g (3 mol) of methyl isobutyl ketone (MIBK), and 300 g (equal to the weight of MIBK) of toluene. The mixture was heated to 120 to 140° C. at which a dehydration reaction was continued for 12 hours while refluxing until 36.47 g of water was removed. The reaction mixture was evaporated under reduced pressure to remove unreacted MIBK and toluene to give a ketimine compound. The resulting ketimine compound was designated epoxy resin curing agent composition K-1.

The weight ratio of the low molecular PPG diamine (Mw: 230) and the high molecular PPG diamine (Mw: 2000) used in the reaction and the degree of ketimination and the active hydrogen equivalent of the resulting ketimine compound are shown in Table 1 below.

The degree of ketimination was calculated from the integral ratio of the methyl protons of isobutyl ketone of added MIBK at around 0.9 ppm to those of PPG diamine at around 1.2 ppm in the $^1$H-NMR spectrum. The active hydrogen equivalent is a quotient of the weight of the ketimine compound divided by the number of the active hydrogen atoms generated on release of the ketone compound.

EXAMPLES 2 TO 6

Ketimine compounds were prepared in the same manner as in Example 1, except for changing the kind and amount of the PPG diamines and the amount of the PTS triethylamine salt as shown in Table 1 below. The resulting ketimine compounds were designated epoxy resin curing agent compositions K-2 through K-6.

The weight ratio of the low molecular PPG diamine (Mw: 230 or 400) and the high molecular PPG diamine (Mw: 2000) used in the reaction and the degree of ketimination and the active hydrogen equivalent of the resulting ketimine compound are shown in Table 1.

TABLE 1

Epoxy Resin Curing Agent Composition

| | | Example | | | | | |
|---|---|---|---|---|---|---|---|
| | | 1 | 2 | 3 | 4 | 5 | 6 |
| Designation | | K-1 | K-2 | K-3 | K-4 | K-5 | K-6 |
| PPG Diamine | Mw: 230 | 230 | 230 | 230 | | | |
| | Mw: 400 | | | | 400 | 400 | 400 |
| | Mw: 2000 | 26 | 58 | 153 | 45 | 100 | 266 |
| | Mw: 180 | | | | | | |
| | Mw: 4000 | | | | | | |
| PTS Triethylamine Salt | | 0.26 | 0.29 | 0.38 | 0.45 | 0.5 | 0.67 |
| PTS | | | | | | | |
| MIBK | | 300 | 300 | 300 | 300 | 300 | 300 |
| Toluene | | 300 | 300 | 300 | 300 | 300 | 300 |
| Low Mw/High Mw (by wt.) | | 9/1 | 8/2 | 6/4 | 9/1 | 8/2 | 6/4 |
| Degree of Ketimination (%) | | 100 | 100 | 100 | 100 | 100 | 100 |
| Active Hydrogen Equivalent | | 104 | 111 | 130 | 150 | 160 | 188 |

EXAMPLES 7 TO 11

Ketimine compounds were prepared in the same manner as in Example 1, except for changing the amount of the PPG diamines and the PTS triethylamine salt as shown in Table 2 below. The resulting ketimine compounds were designated epoxy resin curing agent compositions C-1 to C-5.

The weight ratio of the low molecular PPG diamine (Mw: 400 or 180) and the high molecular PPG diamine (Mw: 2000 or 4000) used in the reaction and the degree of ketimination and the active hydrogen equivalent of the resulting ketimine compound are shown in Table 2.

COMPARATIVE EXAMPLE 1

In a 1-liter volume, four-necked flask equipped with a reflux tube were charged 400 g (1 mol) of PPG diamine (Mw: 400), 0.4 g (corresponding to 0.1 wt % of the PPG diamine) of PTS, 300 g (3 mol) of MIBK, and 300 g (equal to the weight of MIBK) of toluene. The mixture was heated to 120 to 140° C. at which a dehydration reaction was continued for 20 hours while refluxing. The reaction mixture was evaporated under reduced pressure to remove unreacted MIBK and toluene to give a ketimine compound. The resulting product was designated epoxy resin curing agent composition C-6.

The degree of ketimination and the active hydrogen equivalent of the resulting ketimine compound are shown in Table 2 below.

TABLE 2

Epoxy Resin Curing Agent Composition

| | | Example | | | | | Comp. |
|---|---|---|---|---|---|---|---|
| | | 7 | 8 | 9 | 10 | 11 | Ex. 1 |
| Designation | | C-1 | C-2 | C-3 | C-4 | C-5 | C-6 |
| PPG Diamine | Mw: 230 | | | | | | |
| | Mw: 400 | 400 | | 400 | 400 | | 400 |
| | Mw: 2000 | | 45 | | 400 | 500 | |
| | Mw: 180 | | 180 | | | | |
| | Mw: 4000 | 100 | | | | | |
| PTS Triethylamine Salt | | 0.5 | 0.25 | 0.4 | 0.8 | 0.5 | |
| PTS | | | | | | | 0.4 |
| MIBK | | 300 | 300 | 300 | 300 | 300 | 300 |
| Toluene | | 300 | 300 | 300 | 300 | 300 | 300 |
| Low Mw/High Mw (by wt.) | | 8/2 | 8/2 | 10/0 | 5/5 | 0/10 | 10/0 |
| Ketimination Degree (%) | | 100 | 100 | 100 | 100 | 100 | 80 |
| Active Hydrogen Equivalent | | 163 | 96 | 141 | 207 | 521 | 133 |

EXAMPLES 12 TO 22 AND COMPARATIVE EXAMPLE 2

Each of the epoxy resin curing agent compositions obtained in Examples 1 to 11 and Comparative Example 1 and Adeka Resin EP-4100 (bisphenol A epoxy resin available from Asahi Denka Co., Ltd.; epoxy equivalent: 190)

were compounded to prepare a one-component curable epoxy resin composition in which the active hydrogen equivalent of the former and the epoxy equivalent of the latter were equal.

The resulting epoxy resin compositions were evaluated for storage stability, curability, adhesion to mortar, and adhesion to a soft steel plate in accordance with the following methods. The results obtained are shown in Tables 3 and 4.

1) Storage Stability

The epoxy resin composition was put in a closed glass bottle and stored at 50° C. After one month storage, the increase of viscosity was measured to evaluate storage stability on the following rating system.

Viscosity increase=1.5 times or less: 5 points

Viscosity increase=1.5 to 2 times: 4 points

Viscosity increase=2 to 5 times: 3 points

Viscosity increase=5 times or more: 2 points

Gelation: 1 point

2) Curability

The epoxy resin composition was applied to a tin plate to a thickness of 100 μm. The coated tin plate was placed in an atmosphere of 23° C. and 60% RH. The curability (drying properties) of the coating film was evaluated on the next day. A tack-free state was given 5 points. The point decreased with tackiness, and absolutely no cure was given 1 point.

3) Adhesion to Mortar

The epoxy resin composition was applied to a mortar plate to a thickness of 100 μm. The coated mortar plate was placed in an atmosphere of 23° C. and 60% RH. Seven days later, the adhesion of the coating film was evaluated by using a cutter and rated according to the following point system.

100% cohesive failure: 5 points 80 to 99% cohesive failure: 4 points 50 to 80% cohesive failure: 3 points Less than 50% cohesive failure: 2 points Interfacial separation: 1 point 4) Adhesion to Soft Steel Plate The epoxy resin composition was applied to a soft steel plate to a thickness of 100 μm. The coated soft steel plate was placed in an atmosphere of 23° C. and 60% RH. Seven days later, the adhesion of the coating film was evaluated by using a cutter and rated according to the same point system as in (3) above.

TABLE 3

One-Component Curable Epoxy Resin Composition

|  | Example | | | | | |
| --- | --- | --- | --- | --- | --- | --- |
|  | 12 | 13 | 14 | 15 | 16 | 17 |
| Designation | K-1 | K-2 | K-3 | K-4 | K-5 | K-6 |
| Storage Stability | 5 | 5 | 5 | 5 | 5 | 5 |
| Curability | 5 | 5 | 4 | 4 | 4 | 4 |
| Adhesion to Mortar Plate | 5 | 5 | 5 | 5 | 5 | 5 |
| Adhesion to Soft Steel Plate | 4 | 4 | 4 | 4 | 4 | 4 |

TABLE 4

One-Component Curable Epoxy Resin Composition

|  | Example | | | | | Comp. |
| --- | --- | --- | --- | --- | --- | --- |
|  | 18 | 19 | 20 | 21 | 22 | Ex. 2 |
| Designation | C-1 | C-2 | C-3 | C-4 | C-5 | C-6 |
| Storage Stability | 5 | 5 | 5 | 5 | 5 | 2 |
| Curability | 2 | 5 | 5 | 2 | 1 | 5 |
| Adhesion to Mortar Plate | 4 | 2 | 2 | 4 | 2 | 2 |
| Adhesion to Soft Steel Plate | 5 | 2 | 2 | 4 | 2 | 2 |

It is seen from Tables 1 and 2 that a ketimine compound having a high degree of ketimination can be obtained by carrying out the reaction between the polyoxypropylenediamine component and the ketone compound in the presence of p-toluenesulfonic acid triethylamine salt (Examples 1 to 11). It is also seen from Tables 3 and 4 that these ketimine compounds with a degree of ketimination of 90% or higher provide one-component curable epoxy resin compositions having excellent storage stability (Examples 12 to 22).

From the results in Table 4, the following observations are made on the epoxy resin compositions containing the ketimine compound obtained from the polyoxypropylenediamine component and the ketone compound. Use of the ketimine compound prepared by using polyoxypropylenediamine having a molecular weight of 200 to 500 and polyoxypropylenediamine having a molecular weight exceeding 3000 in a weight ratio of 8/2 resulted in an epoxy resin composition with poor curability (Example 18). Use of the ketimine compound prepared by using polyoxypropylenediamine having a molecular weight less than 200 and polyoxypropylenediamine having a molecular weight of 1000 to 3000 in a weight ratio of 8/2 or the ketimine compound prepared by using polyoxypropylenediamine having a molecular weight of 200 to 500 alone resulted in an epoxy resin composition exhibiting poor adhesion to a substrate (Examples 19 and 20). When polyoxypropylenediamine having a molecular weight of 200 to 500 and polyoxypropylenediamine having a molecular weight of 1000 to 3000 were combined in a mixing weight ratio of 5/5, the resulting ketimine compound provided an epoxy resin composition having poor curability (Example 21). When in using the ketimine compound prepared by using polyoxypropylenediamine having a molecular weight of 1000 to 3000 alone, the resulting epoxy resin composition was not only inferior in adhesion but extremely poor in curability (Example 22). When in using the ketimine compound prepared by using polyoxypropylenediamine having a molecular weight of 200 to 500 alone and having a degree of ketimination of less than 90%, the resulting epoxy resin composition was inferior in not only adhesion but storage stability (Comparative Example 2).

In contrast, as is apparent from the results in Table 3, the ketimine compounds obtained by using a combination of polyoxypropylenediamine having a molecular weight between 200 and 500 and polyoxypropylenediamine having a molecular weight of 1000 to 3000 in a weight ratio of 9/1 to 6/4 provided one-component curable epoxy resin compositions excellent in storage stability, curability, and adhesion to a substrate (Examples 12 to 17).

The present invention provides an epoxy resin curing agent composition capable of providing a one-component curable epoxy resin composition excellent in storage stability, curability, and adhesion to a substrate.

What is claimed is:

1. An epoxy resin curing agent composition containing a ketimine compound prepared by the reaction between a polyoxypropylenediamine component and a ketone compound, the polyoxypropylenediamine component being a mixture comprising polyoxypropylenediamine having a Mw of 200 to 500 and polyoxypropylenediamine having a Mw of 1000 to 3000 at a weight ratio of 9/1 to 6/4.

2. The epoxy resin curing agent composition according to claim 1, wherein the ketone compound is methyl isobutyl ketone.

3. The epoxy resin curing agent composition according to claim 1, wherein the ketimine compound has a degree of ketimination of 90% or higher.

4. The epoxy resin curing agent composition according to claim 1, wherein the reaction is carried out in the presence of a catalyst selected from the group consisting of a combination of a tertiary amine and a sulfonic acid and a salt between a tertiary amine and a sulfonic acid.

5. The epoxy resin curing agent composition according to claim 4, wherein the catalyst is a triethylamine salt of p-toluenesulfonic acid.

6. A one-component curable epoxy resin composition comprising a polyepoxy compound and the epoxy resin curing agent composition according to claim 1.

7. The one-component curable epoxy resin composition according to claim 6, which is useful for coating applications.

* * * * *